United States Patent Office 3,047,993
Patented Aug. 7, 1962

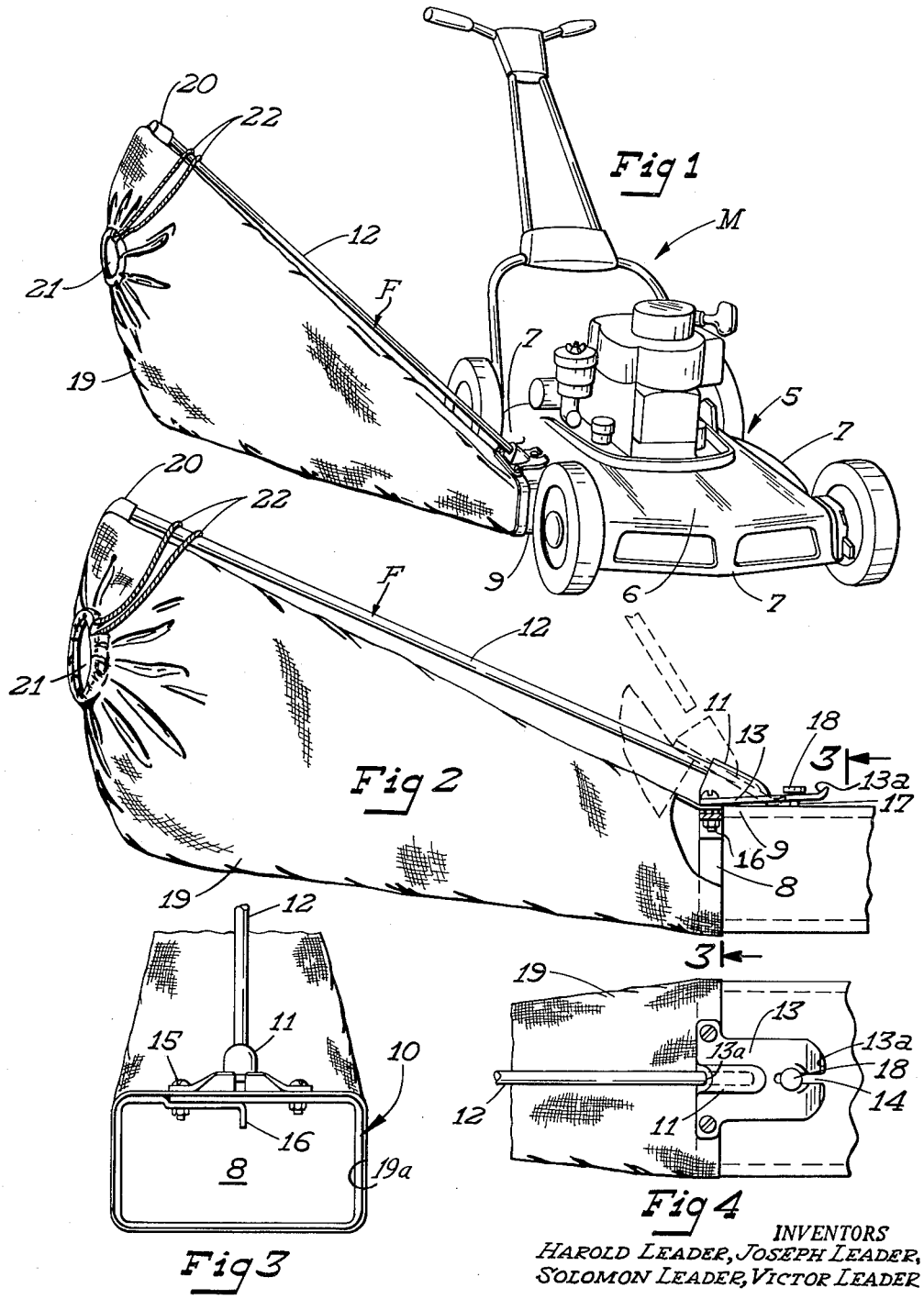

3,047,993
BAGGING ATTACHMENT FOR ROTARY
LAWN MOWERS
Harold Leader, 3100 Rhode Island Ave. S.; Joseph S. Leader, 2116 Xerxes Ave. N.; Solomon Leader, 1114 Russell Ave. N.; and Victor Leader, 2339 Sheridan Ave. N., all of Minneapolis, Minn.
Filed June 27, 1960, Ser. No. 38,951
6 Claims. (Cl. 56—202)

This invention relates to bagging attachments for rotary lawn mowers. More particularly it relates to an attachment for rotary lawn mowers for supporting an air pervious bag upon a rotary lawn mower in position to receive grass cuttings discharged therefrom.

It is a general object of our invention to provide a novel and improved bagging attachment for rotary lawn mowers of simple and inexpensive construction and increased adaptability.

A more specific object is to provide a novel and improved bagging attachment for rotary lawn mowers of simple and inexpensive construction capable of quick and easy attachment and detachment relative to the rotary lawn mower housing.

Another object is to provide a novel and improved bagging attachment for rotary lawn mowers capable of being quickly and easily collapsed to facilitate shipping and storing thereof in small compass while maintaining simple and inexpensive construction.

Another object is to provide a novel and improved bagging attachment for rotary lawn mowers having improved means for ready attachment and detachment relative to the rotary lawn mower housing.

These and other objects and advantages of our invention will more fully appear from the following description, made in connection with the accompanying drawings, wherein like reference characters refer to the same or similar parts throughout the several views, and in which:

FIG. 1 is a perspective view of one embodiment of our invention shown attached to a rotary lawn mower housing for use in conjunction therewith;

FIG. 2 is a fragmentary side elevational view of the same on an enlarged scale;

FIG. 3 is a fragmentary end elevational view of the attachment when detached from the housing, viewed from an approximate position along line 3—3 of FIG. 2; and FIG. 4 is a fragmentary plan view on an enlarged scale of the socket member and means for securing the attachment to the housing.

The embodiment shown in the drawings is shown attached to a rotary lawn mower M which includes a housing 5 having a top wall 6 and four generally vertically extending side walls 7. One of these side walls defines a lateral discharge 8. The portions 9 of the housing 5 which define the lateral discharge 8 are generally inverted U-shaped, similar in construction to that shown in FIG. 7 of U.S. Letters Patent No. 2,932,146, for example.

Our attachment is comprised of a frame F which includes a collar member 10 which is generally rectangular in shape and of size and configuration corresponding to that of the discharge opening defining portions 9 and adapted to embrace the same as shown in FIGS. 1, 2, and 4. This collar member 10 as shown, is made of a flat strip of metal, the ends of which are secured to each other as by bolts 15 to form the rectangular shape.

Rigidly secured to collar member 10 in overhanging relation by bolts 15 and included in frame F is a socket member 11 into which a rigid tubular support member 12 is loosely received so that it may be readily removed therefrom. The opening 11a of the socket member 11 extends upwardly and outwardly from a slotted pivot element 13, comprised of a lateral substantially flat extension which extends in a horizontal direction opposite to that of the support member 12 relative to socket member 11. Because of the orientation of the opening of socket member 11, the support member 12 extends upwardly and outwardly relative to the housing 5.

The outermost portions of the slotted elements 13 extends upwardly, as best shown in FIG. 2, to form a somewhat concave upper surface 13a. A slot 14 is formed in the element 13, this slot extending inwardly from the outer end of the extension as best shown in FIG. 4.

Fixedly secured to the rectangular collar member 10 and depending downwardly from a point immediately below the socket member 11 is an abutment member 16. As shown, this abutment member 16 is actually the extreme end of the strip of metal from which the collar member 10 is made.

The upper wall 6 of the housing 5 as best shown in FIGS. 1, 3 and 4, is provided with an upstanding post member 17. The post member 17 has an enlarged head 18 which is vertically spaced from the upper surface of the top wall 6 a greater distance than the thickness of the element 13. The head post 17 cooperates with the slotted element 13 to provide ready attachment and detachment of the device to housing 5.

An air pervious bag 19 which has a relatively small grass-air inlet defining portion 19a glued to the exterior of the collar member 10, is supported by the support member 12. This support is accomplished by a socket member 20 secured to the exterior surface of the bag 19 and receiving therein the upper end of the support member 12 as clearly shown in FIGS. 1 and 2. The bag 19 has a relatively large discharge outlet 21 which is drawn to a restricted position by cords 22 when the bag is receiving grass cuttings therein.

In use, the attachment may be secured to the housing 5 by merely elevating the socket member 11 to broken line position shown in FIG. 2 and thereupon sliding the element 13 around the post 17, with the element 13 beneath the head 18 and the post 17 received within the slot 14. The entire attachment is then allowed to lower, the weight of the bag and the attachment causing the abutment member 16 to bear against the opening defining portion 9 of the housing in such a manner that a relative air tight seal is obtained between the discharge of the mower and the opening of the collar member 10. When in this position, the grass cuttings and air discharged by the mower M will be received in the bag 19, the excess air passing outwardly through the bag and the restricted discharge 21.

When it is desired to empty the bag, this can be easily accomplished by opening the discharge opening 21 and inverting the entire attachment. We have found that the grass will collect in the outermost portions of the bag 19 adjacent the opening 21 before filling the portions of the bag more immediately adjacent the housing 5. It will be noted that the bag 19 increases progressively in cross sectional dimensions away from the housing 5.

One of the many advantages of our new attachment is the fact that it is so simply constructed and inexpensive. It will be readily appreciated that the attachment can be readily attached or detached relative to the housing 5 with a minimum of inconvenience. One of the most important advantages of our attachment is that it is demountable or collapsible in that the support member 12 can be readily removed from the socket member 11 and the entire device can be shipped or packaged in substantially smaller compass than it has heretofore been possible with attachments of similar nature.

It will, of course, be understood that various changes may be made in the form, details, arrangement and proportions of the parts without departing from the scope of our invention which consists of the matter shown and described herein and set forth in the appended claims.

What is claimed is:

1. A frame for a grass catching bag for use with a rotary type lawn mower having a housing defining a discharge opening upon which a post member is attached to its upper side, said frame comprising: a collar adapted to have opening defining portions of a grass catching bag secured thereto and adapted to register with the discharge opening of such mower; a slotted member attached to the upper side of said collar member and adapted to overly the upper side of the discharge opening defining portions of such mower and to receive such a post member within its slot, said slotted member having up-turned portions adapted to engage the complementary post member on such mower, said slotted member having a socket with an outwardly facing opening; and a bag support detachably engaged in said socket.

2. The structure defined in claim 1 wherein said collar member depends from said socket member.

3. The structure defined in claim 1, and a bag having inlet defining portions encircling said collar member and secured thereto.

4. The structure defined in claim 1, and an air pervious bag having inlet defining portions encircling said collar member and secured therto, said support member extending along said bag exteriorly thereof and connected thereto in supporting relation.

5. The structure defined in claim 1 and an air pervious grass catching bag having inlet defining portions encircling said collar member and secured thereto, and a socket element carried exteriorly by said bag by portions remote from its inlet defining portions and constructed and arranged to receive therein the outer end portion of said support member whereby said bag is supported by said support member.

6. In a grass catching attachment for a rotary type lawn mower comprising: a lawn mower housing defining a discharge member, a collar member adapted to register with said discharge member of said housing in receiving relation, a slotted element carried by one of said members at the upper side thereof, a complementary head post element carried by the other of said members and positioned to be received within said slotted element in cooperative engaging relation, when said collar member is brought into registering relation with said discharge member, a socket with an outwardly facing opening carried by said collar member, a bag support detachably engaged in said socket and supported thereby, and an air pervious bag having inlet defining portions engaging said collar member and secured thereto in receiving relation, and bag support extending along said bag exteriorly thereof and being connected thereto in supporting relation.

References Cited in the file of this patent
UNITED STATES PATENTS

| | | |
|---|---|---|
| 2,855,744 | Phelps | Oct. 14, 1958 |
| 2,856,746 | Machalk | Oct. 21, 1958 |
| 2,887,839 | Pommer | May 26, 1959 |
| 2,932,146 | Campbell | Apr. 12, 1960 |